United States Patent [19]
Greenwood

[11] Patent Number: 4,662,248
[45] Date of Patent: * May 5, 1987

[54] HYDRAULIC CONTROL SYSTEM

[75] Inventor: Christopher J. Greenwood, Leyland, United Kingdom

[73] Assignee: Leyland Vehicles Limited, Leyland, United Kingdom

[*] Notice: The portion of the term of this patent subsequent to Jun. 25, 2002 has been disclaimed.

[21] Appl. No.: 626,217

[22] Filed: Jun. 29, 1984

[30] Foreign Application Priority Data

Jul. 30, 1983 [GB] United Kingdom ............... 8320608

[51] Int. Cl.$^4$ ............................................. B60K 41/14
[52] U.S. Cl. ........................................ 74/867; 74/190.5; 74/868
[58] Field of Search ............... 74/691, 690, 681, 200, 74/201, 190.5, 191, 865, 868, 867

[56] References Cited

U.S. PATENT DOCUMENTS

| | | | |
|---|---|---|---|
| 3,276,279 | 10/1966 | Perry et al. | 74/190.5 |
| 3,327,545 | 6/1967 | Petty | 74/190.5 |
| 3,574,289 | 4/1971 | Scheiter | 74/691 |
| 3,684,065 | 8/1972 | Scheiter | 74/691 |
| 3,823,613 | 7/1974 | Abbott | 74/691 |
| 4,275,610 | 6/1981 | Kraus | 74/201 |
| 4,297,918 | 11/1981 | Perry | 74/200 X |
| 4,524,641 | 6/1985 | Greenwood | 74/691 |
| 4,526,051 | 7/1985 | Kraus | 74/200 |

FOREIGN PATENT DOCUMENTS 2023753 6/1980 United Kingdom ............... 74/200

OTHER PUBLICATIONS

"Wheels Within Wheels", A. Curtis, *Motor*, pp. 15–20, Dec. 18, 1968.

*Primary Examiner*—Leslie Braun
*Assistant Examiner*—Dwight G. Diehl
*Attorney, Agent, or Firm*—Hayes, Davis & Soloway

[57] ABSTRACT

In a continuously-variable-ratio transmission of the toroidal race rolling traction type, each roller is mounted between the opposing disc surfaces in a roller mounting which is displaceable by an hydraulic ram. Each end of the ram has a piston (13 or 14) at the end of the roller mounting sliding in a cylinder (15 or 16).

The hydraulic control system has a combined flow divider and pressure control valve (23) which responds to external control forces (C1 or C2) from solenoids to shift the roller mounting.

Fluid flow in both hydraulic circuits (P, JJ', L'L, R, T and S, MM', K'K, Q, T) is always equalized by the valve (23). Thus displacement of the spools (S1, S2) away from equilibrium, by restricting inlet and outlet ports (R and S or P and Q), raises the pressure in one ram chamber (16 or 15) and displaces the ram. Moreover, the same pressure tends to return the spools to the equilibrium position. Hydraulic stopping of the ram occurs when either ram chamber port (L' or K') is restricted by a piston approaching its extreme position.

16 Claims, 6 Drawing Figures

HYDRAULIC CONTROL SYSTEM

This invention relates to an hydraulic control system, and in particular to such a system for a continuously-variable-ratio transmission of the traction type.

Continuously-variable-ratio transmissions of the toroidal race rolling traction type comprise facing toroidal surfaces with at least one roller interposed therebetween. The ratio is changed by tilting the or each roller towards (or away) from the centre of one disc and away (or towards) the centre of the other. The ratio is not changed by directly twisting the axes of rotation of the rollers; instead it is changed indirectly, by imparting a translational movement to the axes of the rollers. This moves them out of an equilibrium position in which their axes intersect the axis of the transmission, and the rollers then automatically steer themselves back to an equilibrium position in which the roller axes intersect the axis of the transmission. This is explained in detail in an article in Motor, Dec. 28, 1968, entitled "Wheels within wheels" by Anthony Curtis.

The rollers transmit torque. Their mountings are subject to a reaction force, dependent on the torque transmitted. This reaction force is controlled, and hence torque is controlled, by hydraulic pressure in rams acting on the individual roller mountings or in a single pair of rams acting on a mechanical linkage connected to all the roller mountings.

The hydraulic pressure is controlled for example by a microprocessor in a vehicle in which the transmission is mounted. The microprocessor controls the pressure, in conjunction with various factors, to produce a desired characteristic for the driver's foot control.

It is essential to ensure that the rollers cannot run off the discs, and it is unwise to rely solely on the rollers always being controlled in accordance with a set microprocessor strategy. For this reason, means have been proposed for preventing overshoot of the rollers which operate irrespective of the control strategy. UK Patent Application No. 2023753 describes hydraulic stops which prevent roller overshoot: if excess movement of the rollers occurs, the rams for the roller mountings mechanically engage one of two further rams which create a high pressure urging the respective rams away from the extreme position. At the same time the higher pressure acts on the end loading device and so keeps it in step with roller reaction force. Another arrangement is described in our European Patent Application No. 0078125 in which the pressure to resist overshoot of the rollers is built up in the rams of the roller mountings rather than in a separate ram. This avoids the need for many additional rams, and the fluid supply for the end loading device can be taken upstream of the rams, allowing any increased pressure for the hydraulic stops to be applied also to the end loading device.

The present invention further simplifies the hydraulic control circuit, and consists in an hydraulic control system comprising: an hydraulic ram having a piston at each end slidable in a respective ram chamber each with first and second ports; an hydraulic control valve connected to both ram chambers to define two hydraulic control circuits, each circuit passing through a respective ram chamber and the control valve; a source of hydraulic fluid connected to the control valve, the valve being arranged to ensure equal fluid flow rates in the two hydraulic control circuits; and control means acting on the control valve for causing a fluid pressure increase in a selected control circuit to force the ram in a desired direction, the same pressure increase tending to oppose the action of the control means.

Preferably the ram is stopped hydraulically, whenever it approaches either extreme position within the ram chambers, by the relevant piston restricting fluid flow through the relevant first port and causing a fluid pressure increase in that hydraulic control circuit, tending to stop the piston and also to oppose any action of the control means which originally caused the ram to approach the extreme position.

Two embodiments of the invention will now be described with reference to the accompanying drawings, wherein.

The known continuously-variable-ratio transmission will first be described with reference to FIGS. 1 to 3.

Figure 1:
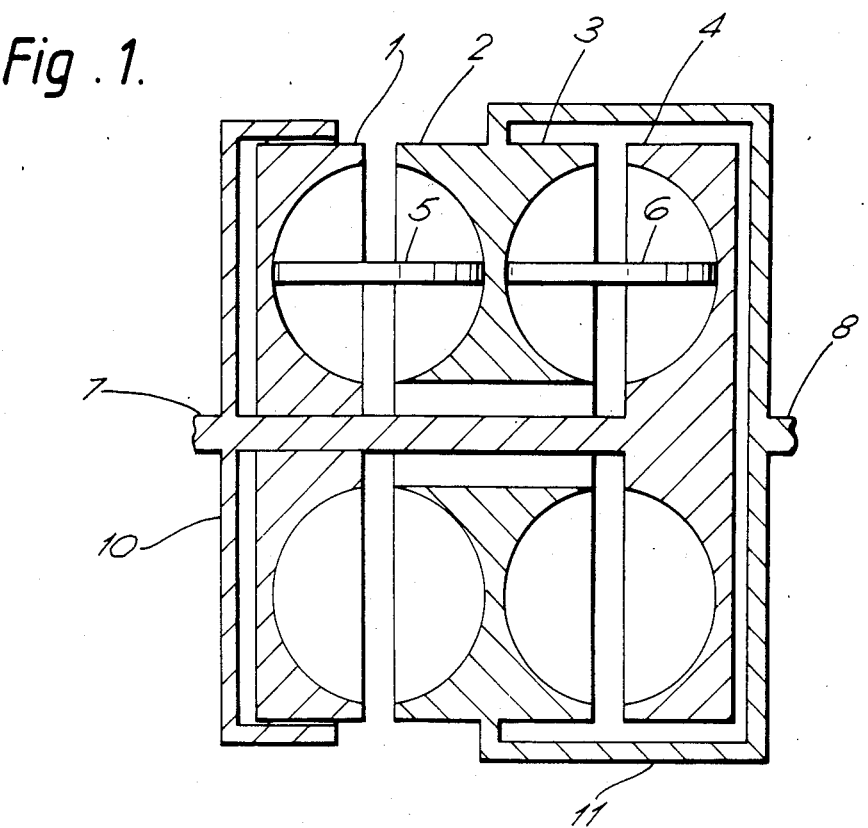
FIG. 1 is a diagrammatic view of a known continuously-variable-ratio transmission.

Referring to FIG. 1, a continuously-variable-ratio transmission of the toroidal race-rolling traction type comprises two pairs 1, 2 and 3, 4 of toroidally recessed discs between each of which three rollers are mounted for rotation. Only one such roller 5, 6 can been seen between each pair of discs in FIG. 1. Discs 1 and 4 rotate with input shaft 7 and discs 2 and 3 rotate with output shaft 8 via a hollow sleeve 11. A bearing enables the end loading pressure between the pairs of discs 1, 4 and 2, 3 to be varied. Hydraulic pressure is applied between the rear of disc 4 and abutment 10, which do not of course rotate relative to each other. Abutment 10 may form a cylinder in which disc 4 moves as the piston.

The ratio of the transmission is varied by tilting the rollers 5 and 6, which as can be seen from FIG. 1 will alter the speed of rotation of the discs 1, 4 relative to the discs 2, 3. The axes of the rollers illustrated in FIG. 1 are initially in the plane of the paper and, as described previously, they are not tilted by directly twisting them about their axes, but by displacing them (at least those illustrated in FIG. 1) into or out of the plane of the paper which causes the rollers to steer up or down the toroidal surfaces until they come to a new equilibrium position.

The continuously-variable-ratio transmission output 8 may be combined in known manner with a direct (but contrarotating) input from the same prime mover that rotates shaft 7 to produce two "regimes" of operation, a first where the combined output varies from reverse, geared neutral and low forward ratios, and a second where the output varies from low to high forward ratios.

Figure 2:
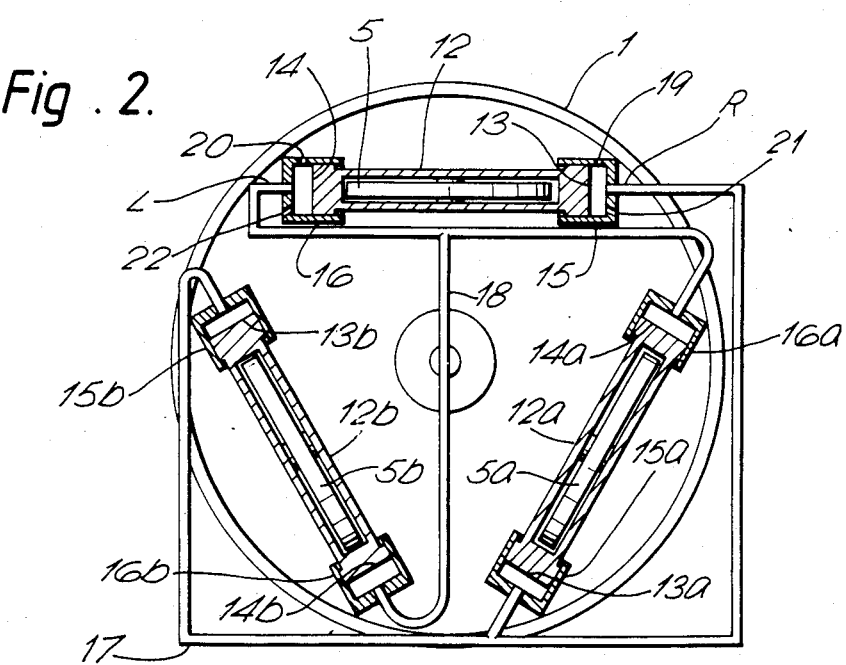
FIG. 2 is a diagrammatic view of the rollers, roller mountings and rams for the roller mountings of the transmission of FIG. 1.
Figure 3:
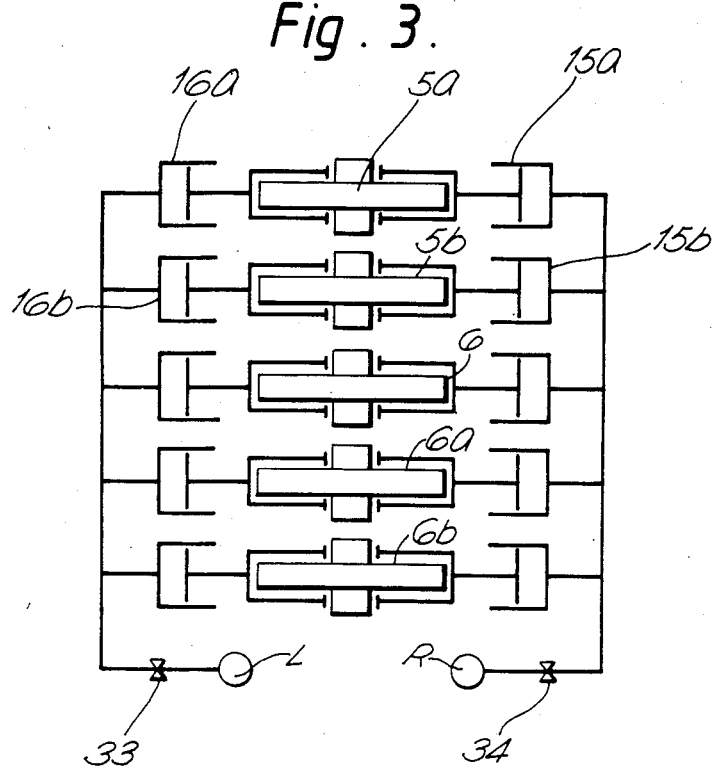
FIG. 3 shows all the hydraulic connection between the roller mountings of the transmission of FIGS. 1 and 2.

FIG. 2 shows one set of rollers 5, 5a and 5b seen in the direction of the transmission with the toroidal discs removed. There is a similar set between the discs 3, 4.

The rollers are rotatably mounted in carriers 12, 12a, 12b the ends of which are pistons 13, 13a, 13b and 14, 14a, 14b movable in chambers, which here are cylinders 15, 15a, 15b, 16, 16a, 16b, to form pairs of rams. The cylinders are rigidly mounted in a spider fixed with respect to the casing of the transmissions. The pistons 15 and 16 are master pistons and communicate with slave pistons 15a, 16a, 15b, 16b by lines 17, 18. The rollers of the other set have similar pistons and cylinders which are also controlled by the master piston and cylinders 15 and 16.

The motions of all the rams are controlled by two hydraulic control circuits connected to ports 19, 21 and ports 20, 22 in the master cylinders 15 and 16 respectively. Any movement of the master roller mounting 12 causes corresponding movement of the other five roller mountings. This is because the master cylinders are connected via ports L, R respectively to the five pairs of slave cylinders, as is shown in FIG. 3. Orifices 33, 34 (FIG. 3), in the hydraulic lines from ports L, R respectively, provide damping.

In an alternative mechanical system, not shown, the hydraulic ram is distinct from all six roller mountings and is linked to them by a mechanised, rather than an hydraulic, linkage. With this system, the ports L, R are redundant.

Figure 4:
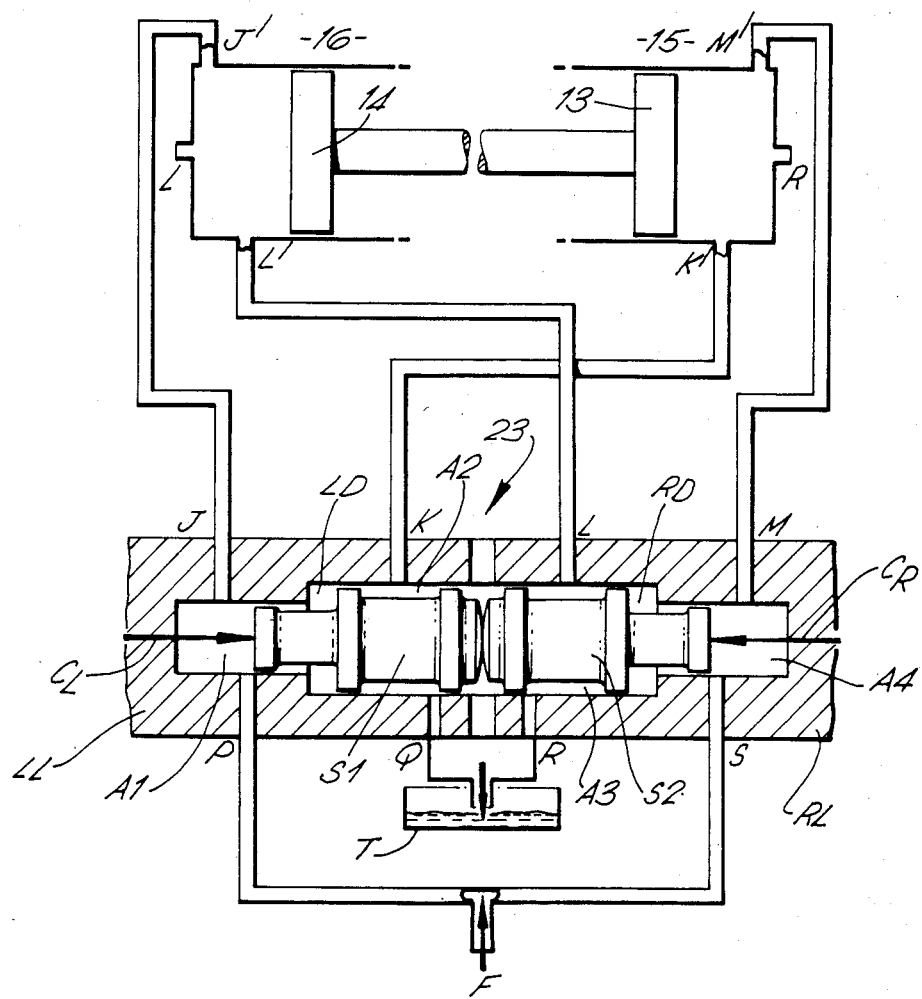
FIG. 4 is a schematic diagram of a first embodiment of the invention.

In accordance with the first embodiment of the invention, shown schematically in FIG. 4, the hydraulic control circuits form part of an hydraulic control system which also comprises a combined flow divider and pressure control valve 23. The valve 23 is manufactured in two identical parts, a left-hand liner LL and a right-hand liner RL. The assembled valve 23 has a wide bore middle portion, including left- and right-hand wide bore chambers A2 and A3. The valve has narrower bore chambers A1, A4 at its ends. Each of the four chambers is connected to the hydraulic ram by a pipe. Hydraulic fluid F enters the system at the narrow bore chambers via inlet ports P, S, and is exhausted from the wide bore chambers into a tank T via ports Q, R. A first hydraulic control circuit, associated with the left-hand piston 14 and ram chamber 16, runs from port P through chamber A1 via pipe JJ', through ram chamber 16, via pipe L'L to chamber A3 and thence to the tank T via outlet port R. A second hydraulic control circuit, associated with the right-hand piston 13 and ram chamber 15, runs from inlet port S through chamber A4, pipe MM', ram chamber 15, pipe K'K, chamber A2 and outlet port Q to Tank T.

The valve 23 contains axially slidable spools S1, S2 having lands which slide along the inner walls of both the narrow and wide bore chambers to define the boundaries of the chambers. The spools face each other at the centre of the valve, and the hydraulic forces always tend to keep them in contact.

The motion of the spools is damped near either extreme position by the compression of fluid in left- and right-hand damping chambers LD, RD lying between internal shoulder (at the boundary of the two different bores) and lands on the spools. The escape of fluid past the spools is restricted and provides the damping action.

The lands on the spools are arranged relative to the valve ports so as to ensure a constant flow of fluid in both hydraulic circuits at all times, and to control the forces on the ram in response to controlled displacement of the spools. Solenoids, or mechanical controllers (not shown), act to provide a control force $C_L$ or $C_R$ to displace the spools. The control forces are generated in response to signals from a microprocessor providing overall control of the transmission.

Ports J, K, L, M connected to the ram are never restricted by the spools. The inlet and outlet ports P, Q, R, S however, are variably restricted by lands on the spools depending on the axial position of the spools.

Should the demand be such as to require the ram to move to the right, a force $C_L$ is generated to push the spools to the right, gradually restricting ports R and S. Equality in the total resistance in both hydraulic circuits is maintained, so that the fluid flow in both is the same. However, the pressure developed in chambers A1 and A3, and in the left-hand ram chamber 16, is greater than in the equilibrium position, forcing the ram towards the right. Moreover, the difference in the bores in chambers A3 and A1 is such that there is a resultant hydraulic force on the spools tending to oppose, and eventually neutralise, the original control force $C_L$. Removal of the force $C_L$ soon restores the system to an equilibrium position, with the spools centralised, and with the ram at the required position. The system is designed such that at equilibrium the pressure drops $\Delta P$ between chambers A1 and A3, or between A2 and A4, due to resistance along the pipes and in the ram chambers, gives rise to a force on the spools which is balanced by the force due to the difference in the bores of the chambers.

If instead the demand is for the ram to move to the left, a force $C_R$ is generated and the system operates in a similar manner, building up a high pressure instead in chambers A2 and A4.

The hydraulic stopping action of the system will now be described. The ram is prevented from movement to either of its extreme positions, whether as a result of the control forces $C_L$ or $C_R$ and the displacement of the spools or for some other reason, by a rapid build-up of pressure in the relevant ram chamber. This pressure is built up when piston 13 (14) has travelled so far towards the extreme position as to restrict fluid flow through ram chamber port K' (L'). The resultant back pressure in the hydraulic circuit, generated by the system which always maintains equal fluid flow in the two circuits, acts on the pistons 13 (14) to tend to return the ram away from the extreme position. Moreover, the back pressure acts on the spools in the control valve in the sense which would reduce the pressure in the opposite ram chambers 16 (15), thereby assisting the stopping action.

The embodiment shown in FIG. 4 includes two spools for ease of manufacture, but the system would work satisfactorily with one spool, or a greater number of spools.

The second embodiment is now described with reference to FIGS. 5 and 6.

The valve 23 consists of a centre portion 26 and two identical liners 24, 25. Two similar spools S1 and S2 slide lengthwise against the interior chamber walls which are of uniform bore. Spool S1 (S2) divides the left-hand (right-hand) part of the valve into chambers A1 and A2 (A3 and A4). One control line L1 connects chamber A1 to port 20 and chamber A2 to port 22 in the in the left-hand ram chamber 16. Another control line L2 connects chamber A3 to port 21 and chamber A4 to port 19 in the right-hand ram chamber 15. As described above, ports L, R in master cylinders 15, 16 connect to the other five pairs of rams.

The spools S1, S2 touch, but are not linked to, a third spool S3 which slides axially through a bore in the centre portion 26. Any movement of spool S1 (S2) towards the centre wall results in a corresponding movement of S2 (S1) away from the centre wall. Two light coil springs X1, X2 in sub-chambers A1, A4 respectively hold the three spools together. With the rams in the positions shown in FIG. 5, chambers A2, A3 are at a higher pressure than chambers A1, A4 due to pressure drops ΔP in the control lines L1, L2, and the spools would tend to separate without the springs X1, X2. An oil flow F enters the valve 23 through inlet ports X, Y into chambers A2, A3 respectively, and returns to a tank or tanks T1, T2 via outlet ports W, Z in chambers A1, A4 respectively.

The function of the spools S1, S2 is selectively to block the inlet and outlet ports W, X, Y, Z while leaving the ports to the control lines continuously open. Displacement control means, for example electric solenoids to be described below with reference to FIG. 6, apply a force C1 or C2 for sliding the spools S1, S2 within the valve 23. The positions of the spools S1, S2 in turn control the position of the ram in a similar way to the system of FIG. 4, except that the ram moves in the opposite direction in response to the same movement of the spools.

Figure 5:
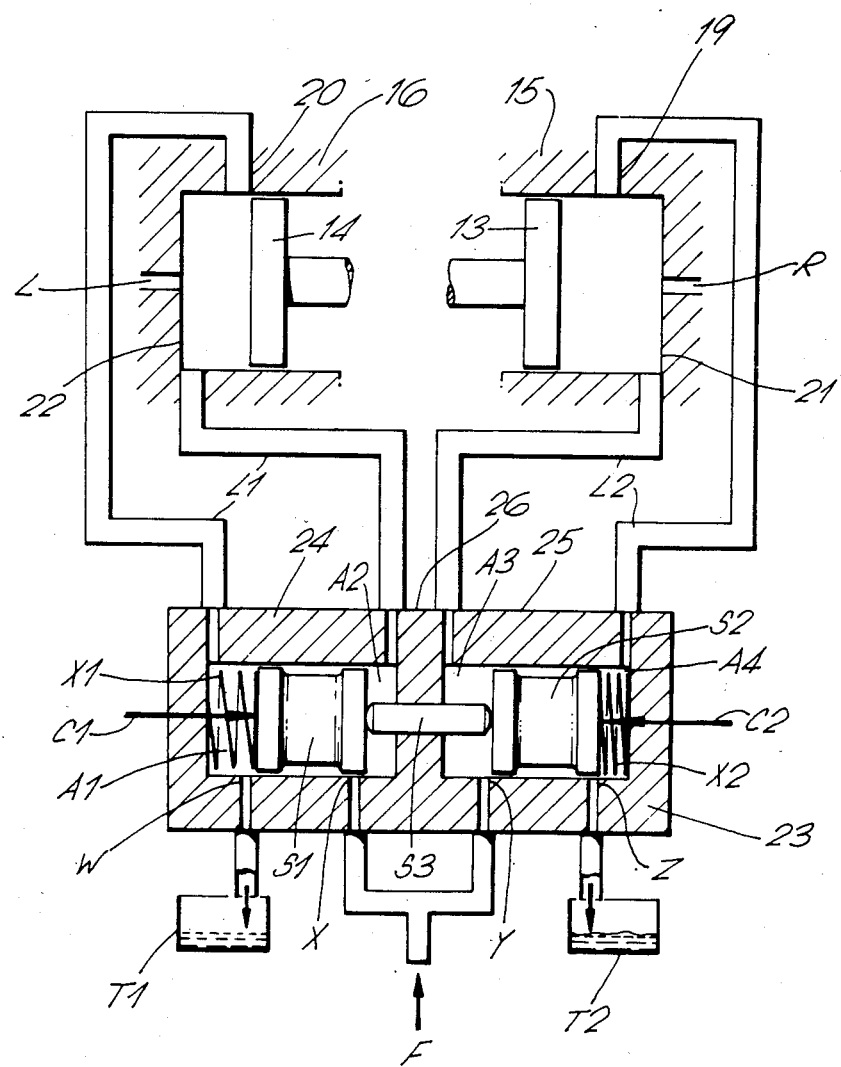
FIG. 5 is a schematic diagram of a second embodiment.

If a microprocessor control circuit for example, senses a demand for a change of gear ratio requiring a shift of the ram to the left in FIG. 5, the displacement control means, i.e. a solenoid in this example, exerts a force C1 on the spool S1. Movement of spools S1 and S2 to the right causes both ports X and Z to be restricted. Under these circumstances, the pressure in both chambers A1, A2 is low, since the flow F into A2 is restricted and port W opens A1 into the tank T1. The pressure in both chambers A3 and A4 is high, because port Y is open but port Z is at least partially closed. The control lines transmit the pressure differential to the respective ram pistons, so that there is an hydraulic pressure tending to move the ram leftwards, the strength of the pressure depending on the precise position of the spools.

The pressure differential between chambers A2, A3 acts to move the third spool S3 leftwards; the forces exerted by the springs X1, X2 and the spools S1, S2 are balanced, so there is a net leftwards force which tends to oppose the original force C1.

As shown in FIG. 5, the ram is approaching its extreme leftwards position. As port 20 in the left-hand ram chamber is steadily restricted by the piston 14 the hydraulic control circuit operates as described above for the first embodiment as an hydraulic stop to prevent the ram moving much further leftwards. As port 20 closes, the left-hand end of the ram chamber 16, and chamber A2 rise to a higher pressure, since port X is now open. The pressures eventually reach the pressures in the right-hand valve chambers A3, A4 and the right-hand ram chamber. The spool set is then no longer balanced, with chamber A1 at low pressure but chambers A2, A3 and A4 at high pressure. This imbalance opposes and eventually overcomes the initial control force C1. Thus the initial disturbing force on the ram is reduced, and the hydraulic stop is effected at a high pressure, as the ram approaches its limit of travel.

If the microprocessor control circuit were to demand an opposite, rightwards shift of the rams, a solenoid on the right-hand side of the valve 23 would apply a control force C2 to the spool S2, and the ram would be moved to the right in an analogous manner. The operation in this sense is completely symmetrical, since the valve itself and the rams are symmetrical.

Figure 6:
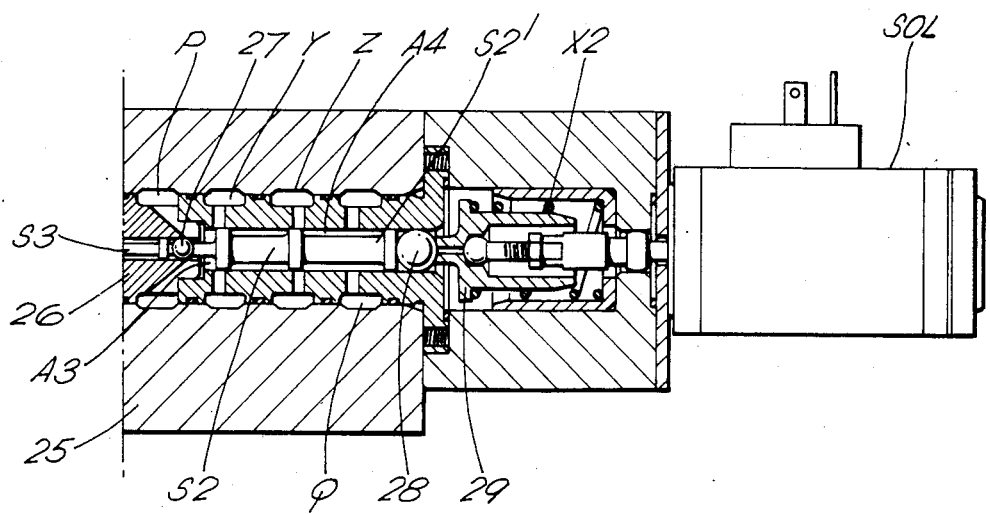
FIG. 6 is a detailed cross-section of one half of the combined flow divider and pressure control valve of FIG. 5 also showing a solenoid for displacement control.

A right-hand half of the combined flow divider and pressure control valve 23 is shown in FIG. 6, which is a cross-sectional view. The left-hand half is a mirror image. Control line L2 connects with chamber A3 via port P, and with chamber A4 via port Q. Spool S2 is shown with an extended portion S2' on the right; the third head of the spool is not shown in FIG. 5, but assists in the damping of the motion of the spool as for the first embodiment.

Spool S3 engages spool S2 through a steel ball 27, and the extended portion S2' of spool S2 engages a plunger by way of a steel ball 28. The plunger 29 is biased leftwards, i.e. towards the centre wall 26, by the coil spring X2, and provides hydraulic damping. The force C2 is applied by a solenoid SOL connected to a control circuit operable by a central microprocessor control (not shown).

What is claimed is:

1. An hydraulic control system comprising: an hydraulic ram having a piston at each end slidable in a respective ram chamber each with first and second ports; one hydraulic control valve connected to the first and second parts of both ram chambers to define two hydraulic control circuits, each circuit passing through a respective ram chamber and the control valve; a source of hydraulic fluid connected to the control valve, the valve being arranged to ensure equal fluid flow rates in the two hydraulic control circuits; and control means acting on the control valve for causing a fluid pressure increase in a selected control circuit to force the ram in a desired direction, the fluid pressure increase tending to oppose action of the control means on the control valve.

2. An hydraulic control system according to claim 1, wherein the ram is stopped hydraulically, whenever it approaches an extreme position within either one of the ram chambers, by the piston in that ram chamber restricting fluid flow through the first port in the ram chamber and causing a fluid pressure increase in the hydraulic control circuit connected to the first port in that ram chamber, tending to stop the piston and also to oppose any action of the control means which originally caused the ram to approach the extreme position.

3. An hydraulic control system according to claim 2, wherein the hydraulic control valve has at least one spool defining four chambers each with a port connected to a different one of the ram chamber ports; the control valve adapted for connection to a source of hydraulic fluid and to a tank for exhausting the fluid; such that one control circuit leads from the source through a first valve chamber, through one ram chamber, through a second valve chamber and thence to the tank, and the other circuit leads from the source through a third valve chamber, through the other ram chamber, through a fourth valve chamber and thence to the tank; the ports being positioned with respect to lands on the at least one spool such that progressive displacement by the control means of the at least one spool from an equilibrium position in one direction causes the progressive restriction of one port in each of two chambers, and progressive displacement of the at least one spool from the equilibrium position in the opposite direction causes the progressive restricton of one port in each of two other chambers, whereby fluid pressure increases in the circuit connected to the restricted ports to tend to displace the ram and to oppose the said spool displacement, there being a constant fluid flow at all times through both circuits.

4. An hydraulic control system according to claim 1, wherein the hydraulic control valve has at least one spool defining four chambers each with a port connected to a different one of the ram chamber ports; the control valve adapted for connection to a source of hydraulic fluid and to a tank for exhausting the fluid; such that one control circuit leads from the source through a first valve chamber, through one ram chamber, through a second valve chamber and thence to the tank, and the other circuit leads from the source through a third valve chamber, through the other ram chamber, through a fourth valve chamber and thence to the tank; the ports being positioned with respect to lands on the at least one spool such that progressive displacement by the control means of the at least one spool from an equilibrium position in one direction causes the progressive restriction of one port in each of two chambers, and progressive displacement of the at least one spool from the equilibrium position in the opposite direction causes the progressive restriction of one port in each of two other chambers, whereby fluid pressure increases in the circuit connected to the restricted ports to tend to displace the ram and to oppose the said spool displacement, there being a constant fluid flow at all times through both circuits.

5. An hydraulic control system in accordance with claim 1, wherein the ram pistons restrict the first ports but not the second ports for extreme positions of the ram and wherein each hydraulic control circuit passes through a respective ram chamber by way of the first and second ports; the control valve having at least one spool co-operating with valve ports to ensure the constant fluid flow through both circuits; wherein the progressive displacement of the at least one spool from an equilibrium position in one axial direction causes the fluid pressure in one ram chamber to rise, tending to displace the ram, and wherein the displacement of the ram to an extreme position is progressively stopped by the piston in the said respective ram chamber restricting the first port and causing a comparatively large fluid pressure in the respective ram chamber.

6. An hydraulic control system in accordance with claim 5, wherein the displacement of the ram to an extreme position also tends to raise the fluid pressure in the valve, in such a way as to oppose any displacement of the at least one spool which may originally have caused the ram displacement, the return of the at least one spool towards the equilibrium position in turn reducing the fluid pressure in the relevant ram chamber, assisting in the said hydraulic stopping action of the piston.

7. An hydraulic control system in accordance with claim 6, wherein the control valve is divided by the at least one spool into a narrow bore chamber at each end and two wide bore chambers at a middle portion, a port at each of the narrow bore chambers being connected to a respective second ram chamber port, and a port at each wide bore chamber being connected to a respective first ram chamber port.

8. An hydraulic control system in accordance with claim 7, wherein in each ram chamber the first and second ram chamber ports are separated axially of the ram.

9. An hydraulic control system in accordance with claim 7, wherein the fluid source is connected via inlet porrots to the wide bore chambers, and the tank is connected via outlet ports to the narrow bore chambers, lands on the at least one spool being adapted variably to restrict the inlet and outlet ports in order to establish the constant fluid flow through both circuits at all times.

10. An hydraulic control system in accordance with claim 9, wherein in each ram chamber the first and second ram chamber ports are separated axially of the ram.

11. An hydraulic control system in accordance with claim 5, wherein the control valve is divided by the at least one spool into a narrow bore chamber at each end and two wide bore chambers at a middle portion, a port at each of the narrow bore chambers being connected to a respective second ram chamber port, and a port at each wide bore chamber being connected to a respective first ram chamber port.

12. An hydraulic control system in accordance with claim 11, wherein in each ram chamber the first and second ram chamber ports are separated axially of the ram.

13. An hydraulic control system in accordance with claim 11, wherein the fluid source is connected via inlet ports to the wide bore chambers, and the tank is connected via outlet ports to the narrow bore chambers, lands on the at least one spool being adapted variably to restrict the inlet and outlet ports in order to establish the constant fluid flow through both circuits at all times.

14. An hydraulic control system in accordance with claim 13, wherein in each ram chamber the first and second ram chamber ports are separated axially of the ram.

15. A continuously-variable-ratio transmission of the race rolling traction type comprising: a roller mounted in a roller mounting between two opposed traction surfaces; and a hydraulic control system according to claim 1 whose ram acts to displace the roller mounting.

16. An hydraulic control system comprising: an hydraulic ram having a piston at each end slidable in a respective ram chamber each with first and second ports; one hydraulic control valve connected to the first and second parts of both ram chambers to define two hydraulic control circuits, each circuit passing through a respective ram chamber and the control valve; a source of hydraulic fluid connected to the control valve, the valve being arranged to ensure equal fluid flow rates in the two hydraulic control circuits; and control means acting on the control valve for causing a fluid pressure increase in a selected control circuit to force the ram in a desired direction, the fluid pressure increase tending to oppose action of the control means on the control valve; wherein the ram is stopped hydraulically, whenever it approaches an extreme position within either one of the ram chambers, by the piston in that ram chamber restricting fluid flow through the first port in the ram chamber and causing a fluid pressure increase in the hydraulic control circuit connected to the first port in that ram chamber, tending to stop the piston and also to oppose any action of the control means which originally caused the ram to approach the extreme position.

* * * * *